United States Patent [19]
Victorius

[11] 3,773,710
[45] Nov. 20, 1973

[54] FLEXIBLE THERMOSETTING ACRYLIC COATING COMPOSITIONS

[75] Inventor: Claus Victorius, Media, Pa.

[73] Assignee: E. I. du Pont de Nemours and Company, Wilmington, Del.

[22] Filed: May 26, 1972

[21] Appl. No.: 257,239

[52] U.S. Cl...... 260/41 B, 260/31.2 R, 260/33.6 U, 260/41 C, 260/856, 260/859, 117/61

[51] Int. Cl....................... C08g 39/10, C08g 51/22

[58] Field of Search.................... 260/901, 856, 859, 260/41 BC, 334 R, 33.6 U, 328 R, 31.2 R; 117/161

[56] References Cited
UNITED STATES PATENTS

| | | | |
|---|---|---|---|
| 3,249,463 | 6/1966 | Carlee | 117/76 |
| 3,028,367 | 4/1962 | O'Brien | 260/77.5 |
| 3,438,800 | 4/1969 | Johnson | 117/64 |
| 3,557,033 | 1/1971 | Briton | 260/21 |

OTHER PUBLICATIONS
Film–Forming Compositions, Allyn "Acrylic Ester Resins," pp. 38–68, 1967.

Primary Examiner—Allan Lieberman
Assistant Examiner—Richard Zaitlen
Attorney—Hilmar L. Fricke

[57] ABSTRACT

The thermosetting acrylic enamel has as film-forming constituents a polyblend of a relatively hard acrylic polymer that has a glass transition temperature of greater than −20°C., and a soft acrylic polymer that has a glass transition temperature of less than −20°C., wherein the difference in glass transition temperature between the hard and soft acrylic polymer is at least 30°C.; and a heat reactive condensate such as hexa-(methoxymethyl)melamine, a butylated or methylated melamine formaldehyde resin, or a polyisocyanate that is compatible with the polyblend;

the acrylic enamel forms a flexible, durable finish useful for example for rubber-coated automobile and truck bumpers, as a finish for plastics for foamed structures, for flexible metal substrates, for example, for coil coatings 8 Claims, No Drawings

FLEXIBLE THERMOSETTING ACRYLIC COATING COMPOSITIONS

BACKGROUND OF THE INVENTION

This invention relates to a thermosetting acrylic enamel and in particular to a thermosetting acrylic enamel that forms a tough, flexible and durable finish.

Thermosetting acrylic enamels are known as shown in Frazier et al. U.S. Pat. No. 2,681,897, issued June 22, 1954, Bearden U.S. Pat. No. 3,311,583, issued Mar. 28, 1967; Vasta U.S. Pat. No. 3,338,860, issued Aug. 29, 1967; Fisk et al. U.S. Pat. No. 3,365,414, issued Jan. 23, 1968; Vasta U.S. Pat. No. 3,622,651, issued Nov. 23, 1971. These coating compositions are adequate for many uses but do not have the balance of properties necessary for flexible finishes for rubber-coated automobile and truck bumpers, for foamed structures, for plastics, for flexible metal substrates, and the like. These substrates require a finish which is tough, flexible even at low temperatures, mar-resistant and has a high temperature tack resistance.

The novel thermosetting acrylic enamel of this invention is a polyblend of a hard acrylic copolymer with a soft acrylic copolymer that is blended with a suitable cross-linking agent to provide a finish having the aforementioned properties.

STATEMENT OF THE INVENTION

The liquid coating composition comprises 10–50 percent by weight of film-forming constituents and a solvent for these constituents; wherein the film-forming constituents comprise:

I. 70–95 percent by weight, based on the weight of the film-forming constituents, of a polyblend of
  A. 60–95 percent by weight, based on the weight of the polyblend, of a relatively hard acrylic polymer that has a glass transition temperature of greater than −20°C. and consists essentially of
   1. 20–60 percent by weight, based on the weight of the acrylic polymer, of an alkyl methacrylate having one to four carbon atoms in the alkyl group or styrene or a mixture of the alkyl methacrylate and styrene;
   2. 20–75 percent by weight, based on the weight of the acrylic polymer, of an alkyl methacrylate having 6 to 12 carbon atoms in the alkyl group or an alkyl acrylate having two to twelve carbon atoms in the alkyl group or a mixture of these constituents;
   3. 5–20 percent by weight, based on the weight of the acrylic polymer, of a hydroxy alkyl acrylate or a hydroxy alkyl methacrylate or a mixture of these constituents having two to four carbon atoms in the alkyl groups;
  B. 5–40 percent by weight, based on the weight of the polyblend, of a soft acrylic polymer having a glass transition temperature of less than −20°C. and consisting essentially of
   1. 80–95 percent by weight, based on the weight of the acrylic polymer, of an alkyl acrylate having two to twelve carbon atoms in the alkyl group or an alkyl methacrylate having eight to twelve carbon atoms in the alkyl group or a mixture of these constituents; and
   2. 5–20 percent by weight, based on the weight of the acrylic polymer, of a hydroxy alkyl acrylate or a hydroxy alkyl methacrylate or a mixture thereof having two to four carbon atoms in the alkyl groups; wherein the difference in glass transition temperature between the hard and soft acrylic polymer is at least 30°C. and the hard and soft acrylic polymers have a relative viscosity of about 1.05–1.30.

II. 5–30 percent by weight, based on the weight of the film-forming constituents, of a compatible cross-linking agent which either can be alkylated melamine formaldehyde resin having one to eight carbon atoms in the alkyl group or a polyisocyanate.

DESCRIPTION OF THE INVENTION

The novel coating composition of this invention has a solids content of film-forming constituents of about 10–50 percent and preferably, about 20–40 percent by weight. The novel composition can be clear or pigmented and if pigmented contains about 0.1–20 percent by weight pigment.

The film-forming constituents used in the novel coating composition comprise 70–95 percent by weight of a polyblend and correspondingly 30–5 percent by weight of a compatible crosslinking agent. The polyblend contains 60–95 percent by weight of a relatively hard acrylic polymer that has a glass transition temperature of greater than −20°C to about 40°C., and 40–5 percent by weight of a soft acrylic polymer which has a glass transition temperature of about −20°C to about −80°C., provided that the difference in glass transition temperature between the hard and soft acrylic polymer is at least 30°C., and preferably about 35°C. to 70°C.

The acrylic polymers utilized in this invention are prepared by conventional polymerization techniques in which the monomers are blended with solvents and polymerization catalysts and heated to about 75°–150°C. for about 2–6 hours to form a polymer that has a relative viscosity of about 1.05-1.30 and preferably, about 1.06–1.20.

The relative viscosity is the value obtained by dividing the efflux time of the solution of the polymer by the efflux time of the solvent used to form the above polymer solution. The efflux times are measured according to the procedure of ASTM-D-445-46-T, Method B, using as the polymer solution 0.5 gram of the polymer dissolved in methlethyl ketone to give 50 cubic centimeters of solution. The efflux time is measured at a temperature of 30°C. in a standard apparatus sold under the designation of modified Ostwald viscometer.

Typical solvents which are used to prepare the acrylic polymer and also used as diluent in the novel coating composition of this invention are toluene, xylene, butyl acetate, ethyl acetate, acetone, methlethyl ketone, methyl-isobutyl ketone, ethyl alcohol, butyl alcohol and other aromatic hydrocarbons, cycloaliphatic hydrocarbons, esters, ethers, ketones and alcohols, such as are conventionally used.

About 0.1–4 percent by weight, based on the weight of the monomers used to prepare the acrylic polymer, of a polymerization catalyst, is used. Typical catalysts are azo-bis-isobutyronitrile, azo-bis-(α, gamma-dimethyl-valeronitrile), benzoyl peroxide, t-butyl peroxy pivalate, di-tert-butyl peroxide and the like. Up to 5 percent by weight of a chain transfer agent can be used to control molecular weight such as dodecyl mercaptan or benzene thiol.

The glass transition temperature of the acrylic polymer is the temperature at which the viscosity of the polymer is $10^{13}$ poises.

The combination of a hard and soft acrylic polymer for a particular polyblend enamel composition is usually chosen so that the two polymers contain the same alkyl acrylate or alkyl methacrylate or both.

The hard acrylic polymer utilized in the novel coating composition of this invention contains 20–60 percent by weight, based on the acrylic polymer, of an alkyl methacrylate that has one to four carbons in the alkyl group or styrene or a mixture of the alkyl methacrylate and styrene. Typical alkyl methacrylates which can be used are methyl methacrylate, ethyl methacrylate, propyl methacrylate, isopropyl methacrylate, butyl methacrylate, isobutyl methacrylate and the like. Preferably, the hard acrylic polymer contains 24.9–55 percent by weight of methyl methacrylate.

The hard acrylic polymer also contains 20–75 percent by weight, based on the weight of the acrylic polymer, of an alkyl methacrylate that has six to twelve carbon atoms in the alkyl group, or an alkyl acrylate that has two to twelve carbon atoms in the alkyl group or a mixture of the alkyl methacrylate and the alkyl acrylate. Typical alkyl methacrylates that can be used are hexyl methacrylate, 2-ethylhexyl methacrylate, octyl methacrylate, nonyl methacrylate, decyl methacrylate, and lauryl methacrylate. Typical alkyl acrylates that can be used are ethyl acrylate, propyl acrylate, butyl acrylate, isobutyl acrylate, hexyl acrylate, 2-ethylhexyl acrylate, octyl acrylate, nonyl acrylate, decyl acrylate, lauryl acrylate and the like. Preferably the hard acrylic polymer contains 35–60 percent by weight of an alkyl acrylate having two to eight carbon atoms in the alkyl group.

The hard acrylic polymer contains 5–20 percent by weight, preferably 5–15 percent by weight of hydroxy alkyl acrylate or a hydroxy alkyl methacrylate or a mixture thereof that has two to four carbon atoms in the alkyl groups. Typical compounds of this type are hydroxyethyl acrylate, hydroxypropyl acrylate, hydroxybutyl acrylate, hydroxyethyl methacrylate, hydroxypropyl methacrylate, hydroxybutyl methacrylate and the like.

The soft acrylic polymer contains 80–95 percent by weight of an alkyl acrylate that has two to twelve carbon atoms in the alkyl group or an alkyl methacrylate that has eight to twelve carbon atoms in the alkyl group or a mixture of these constituents. Any of the aforementioned alkyl acrylates and alkyl methacrylates can be utilized in preparing this soft acrylic polymer. Correspondingly, the soft acrylic polymer contains 5–20 percent by weight of a hydroxy alkyl acrylate or a hydroxy alkyl methacrylate that has two to four carbon atoms in the alkyl group. Any of the aforementioned hydroxy alkyl methacrylates or acrylates can be used in preparing the soft acrylic polymer.

The soft acrylic polymer can contain up to 20 percent by weight of an alkyl methacrylate having one to four carbon atoms in the alkyl group or styrene provided that the glass transition temperature is below −20°C.

Both the hard and the soft acrylic polymer can contain 0.1–5 percent by weight of an $\alpha,\beta$-ethylenically unsaturated carboxylic acid such as acrylic acid, methacrylic acid, itaconic acid, crotonic acid, ethacrylic acid, propyl carylic acid, and the like.

One preferred soft acrylic polymer contains 85–94.9 percent by weight of an alkyl acrylate having two to eight carbon atoms in the alkyl group, 5–15 percent by weight of a hydroxy alkyl acrylate or methacrylate having two to four carbon atoms in the alkyl group and 0.1–5 percent by weight of methacrylic acid or acrylic acid.

One highly preferred soft acrylic polymer contains 85–95 percent by weight of ethyl acrylate and 5–15 percent by weight of hydroxyethyl acrylate and has a glass transition temperature −22°C. to −23°C.

Another highly preferred soft acrylic polymer contains 80–94 percent by weight of butyl acrylate, 5–15 percent by weight of hydroxy ethylacrylate and 1–5 percent by weight of acrylic or methacrylic acid and has a glass transition temperature of about −44°C. to about −52°C.

The following are preferred hard acrylic polymers:

28–50 percent by weight of methyl methacrylate, 40–46 percent by weight of butyl acrylate, 5–15 percent by weight of hydroxyethyl acrylate, 1–5 percent by weight of acrylic acid or methacrylic acid wherein the polymer has a glass transition temperature of about 16°C to −19°C; and 35–55 percent by weight of methyl methacrylate, 30–60 percent by weight of ethyl acrylate and 5–15 percent by weight of hydroxy ethyl acrylate having a glass transition temperature of about 34°C to 10°C.

The cross-linking agent used in the novel coating composition of this invention is compatible with both the acrylic polymers of the polyblend and can either be an alkylolated melamine formaldehyde resin or a polyisocyanate. Typical alkylolated melamine formaldehyde resins have one to eight carbon atoms in the alkyl group and are resins that are well known in the art. These resins are prepared by conventional techniques in which a lower alkyl alcohol such as methanol, ethanol, butanol, isobutanol, propanol, isopropanol hexanol, 2-ethyl hexanol and the like is reacted with a melamine formaldehyde to provide pendent alkoxy groups.

Preferred melamine resins that are used in this invention are butylated melamine formaldehyde resins, methylated/butylated melamine formaldehyde resins and hexa-(methoxymethyl) melamine.

An acid catalyst can be used in the novel composition such as para-toluene sulfonic acid or butyl acid phosphate. An acid catalyst is needed if there is an absence of acid groups in the acrylic polymer or if a low temperature cure is required, or if a highly etherified melamine resin is used such as hexa(methoxymethyl)melamine.

A variety of organic polyisocyanates can be used in the novel coating composition of this invention and include aliphatic, cycloaliphatic, aralkyl, heterocyclic and aryl polyisocyanates. Typical polyisocyantes are, for example, toluene-2,4-diisocyanate, diphenyl methane-4,4'-diisocyanate, methylene-bis-(4-cyclohexylisocyanate), tetramethylene diisocyanate, hexamethylene diisocyanate, ethylene diisocyanate, cyclohexylene-1,2-diisocyanate, m-phenylene diisocyanate, 1,5-naphthalene diisocyanate, 3,3'-dimethyl-4,4'diphenylene diisocyanate, 4,4'-diphenylene diisocyanate, xylene diisocyanate, 1,3,5-benzene triisocyanate, and the like.

The reaction product of isocyanate and a low molecular weight polyol can also be used. One preferred polyisocyanate of this type is the reaction product of toluene diisocyanate and trimethylol propane. These polyisocyanates can be made according to Bunge et al. U. S. Pat. No. 2,855,421, issued Oct. 7, 1958.

Polyisocyanates of a biuret, for example, the biuret of hexamethylene diisocyanate made according to Mayer et al. U.S. Pat. No. 3,245,941, issued Apr. 12, 1966, can also be used.

Organic plasticizers can also be used in the novel coating composition of this invention in amounts up to 1–10 percent by weight based on the weight of film-forming constituents. Monomeric and polymeric plasticizers can be used such as phthalate ester plasticizers, and in particular, alkyl and cycloalkyl ester phthlates in which the alkyl groups have two to ten carbon atoms such as dioctyl phthalate, didecyl phthalate, butyl benzylphthalate, dicyclohexyl phthalate and mixtures thereof. Epoxidized soya bean oil, oil free and oil modified alkyds can also be used as plasticizers. Polyester resins such as alkylene glycol esters of adipic and benzoic acid, for example, ethylene glycol adipate benzoate, neopentyl glycol adipate benzoate, ethylene glycol adipate benzoate phthalate, can also be used in the novel coating composition of this invention.

The novel coating composition of this invention can be pigmented. Typical pigments which can be used are metallic oxides, preferably titanium dioxide, zinc oxide, iron oxide, and the like, metallic flakes, such as aluminum flake, metallic powders, metallic hydroxides, "Afflair" pigments, i.e., mica coated with titanium dioxide, sulfates, carbonates, carbon blacks, silica, talc, china clay and other pigments, organic dyes and lakes.

Other compatible resins can be incorporated into the novel coating composition of this invention such as vinyl chloride copolymers, polyurethanes, cellulose acetate butyrate, and silicone resins.

The novel coating composition of this invention is applied to a dry substrate such as polyurethane, a foamed polyurethane, rubber, fiberglass, plastic, metal, rubber or foam coated metal by any of the usual application methods, such as spraying electrostatic spraying, dipping, brushing flowcoating and the like. These coatings are then baked for about 5–40 minutes at about 80°–200°C. Shorter baking times can be used such as 1 minute at about 250°C. if the composition is applied by a high-speed coating line. The resulting coating is about 0.5–5 mils thick, preferably a coating of about 1–3 mils in thickness is used. Room temperature curing is also possible with an acid catalyst.

The resulting dried and cured coating is a polyblend structure in which the hard acrylic polymer surrounds particles of the soft acrylic polymer and the entire structure is crosslinked with the alkylated melamine formaldehyde resin or polyisocyanate. The above structure is the result of the hard and soft acrylic polymers having borderline compatibility. In solution the polymers are completely homogeneous but a controlled degree of phase separation of the soft polymer from the hard polymer occurs when the solvents evaporate during film formation on drying of the coating. The cross-linking agent is compatible with both the hard and soft acrylic polymers and is distributed through both phases and forms a uniformly cross-linked structure.

This unique structure provides a coating with excellent toughness and flexibility which is required for many end uses, such as finishes for rubber coated metal substrates, in particular styrene/butadiene rubber coated metal bumpers, finishes for plastics, finishes for coils of metals, finishes for foamed rubber and plastics, such as used for padding and upholstery in automobiles.

The novel coating composition has excellent adhesion to primed and unprimed metal substrates. Conventional primers, electrodeposited primers and also sealers can be used on the substrate over which the novel coating composition of this invention is applied.

The following Examples illustrate the invention. All quantities are on a weight basis unless otherwise indicated:

Example 1

Polymer A solution is prepared as follows:

|  | Parts By Weight |
|---|---|
| Methyl methacrylate monomer | 40.0 |
| 2-Hydroxyethyl acrylate monomer | 10.0 |
| Butyl acrylate monomer | 50.0 |
| Methylethyl ketone | 100.0 |
| Azo-bisisobutyronitrile | 1.2 |
|  | Total 201.2 |

The above ingredients are charged into a vessel which is immersed in a water bath maintained at 70°C. and the vessel is tumbled in this water bath for a period of 16 hours. The resulting solution is clear and homogeneous and does not contain gel particles. 50 Parts by weight of ethylene glycol monoethylether acetate are added to provide a polymer solution having a solids content of 39.7 percent. The resulting hard polymer has a calculated glass transition temperature of −7°C.

Polymer B solution is prepared as follows:

|  | Parts By Weight |
|---|---|
| 2-Hydroxethyl arcylate | 10.0 |
| Butyl acrylate monomer | 90.0 |
| Methylethyl ketone | 100.0 |
| Azo-bisisobutyronitrile | 0.6 |
|  | Total 200.6 |

The above ingredients are charged into a vessel which is placed in a water bath maintained at 70°C. and tumbled for 16 hours. The resulting polymer solution is cleared and does not contain gel particles. 50 Parts by weight of ethylene glycol monoethylether acetate are added to the polymer solution to form a solution having a 38.9 percent solids content. The resulting soft polymer has a calculated glass transition temperature of −52°C.

A coating composition is prepared as follows:

|  | Parts By Weight |
|---|---|
| Polymer A solution (prepared above) | 30.2 |
| Polymer B solution (prepared above) | 7.7 |
| "Cymel" 301 hexa(methoxymethyl) melamine | 1.2 |
| A 2% solution of para-toluene sulfonic acid in isopropanol | 1.2 |
| Solvent blend (methylethyl ketone/ethylene glycol monoethylether acetate in a 1/1 ratio) | 4.7 |
|  | Total 45.0 |

The above ingredients are thoroughly blended together to form a coating composition.

The coating composition is reduced to a spray viscosity with conventional solvents and applied to a styrene butadiene rubber-coated metal substrate, a polyurethane foam utilized in automobile interiors, and a polyurethane foam utilized for automotive bumpers and baked for 30 minutes at 120°C. The resulting coating has excellent adhesion to the substrate, good flexibility, good toughness and had a good appearance and is not hazy in color. Films formed from the novel coating composition have a high elongation at break.

EXAMPLE 2

Polymer C solution is prepared as follows:

|  | Parts by Weight |
|---|---|
| Butyl acrylate monomer | 400.0 |
| Methyl methacrylate monomer | 296.0 |
| 2-Hydroxy ethyl acrylate | 80.0 |
| Acrylic acid | 24.0 |
| Methylethyl ketone | 800.0 |
| Dodecyl mercaptan | 4.0 |
| Azo-bisisobutyronitrile | 8.0 |
|  | Total 1,612.0 |

The above ingredients are charged into a reaction vessel which is immersed in a water bath maintained at 70°C. and the vessel is tumbled in the water bath for 16 hours. The resulting polymer solution is clear and homogeneous and does not contain gel particles. The polymer solution has a polymer solids content of 47.9 percent and the resulting hard polymer has a relative viscosity of 1.102 and a calculated glass transition temperature −7°C.

Polymer D solution is prepared as follows:

|  | Parts By Weight |
|---|---|
| Butyl acrylate | 87.0 |
| 2-Hydroxy ethyl acrylate | 10.0 |
| Acrylic Acid | 3.0 |
| Methyl ethyl ketone | 100.0 |
| Azo-bisisobutyronitrile | 1.0 |
|  | Total 201.0 |

The above ingredients are charged into a reaction vessel which is immersed in a water bath maintained at 70°C. and the vessel is tumbled in the water bath for 16 hours. The resulting polymer solution is clear and homogeneous and does not contain gel particles. 50 Parts by weight of ethylene glycol mono-ethyl ether acetate are added to give a polymer solution having a 35.4 percent polymer solids content. The resulting soft polymer has a relative viscosity of 1.151 and a calculated glass transition temperature of −49°C.

A coating composition is prepared as follows:

|  | Parts By Weight |
|---|---|
| Polymer C solution (prepared above) | 20.5 |
| Polymer D solution (prepared above) | 11.9 |
| Butylated melamine formaldehyde resin solution (55.5% resin solids in butanol) | 4.0 |
| Ethylene glycol monoethyl ether acetate | 8.7 |
|  | Total 45.1 |

The above ingredients are thoroughly blended together to form a coating composition.

The coating composition is reduced to a spray viscosity with conventional solvents and applied to a rubber coated bumper and to a polyurethane foam substrate and baked at 120°C. for 30 minutes. The resulting coating is clear, tough and flexible.

A clear film is formed from the coating composition and the properties are measured and recorded in the attached table.

A pigmented coating composition is prepared as follows:

|  | Parts By Weight |
|---|---|
| Polymer C solution (prepared above) | 265.3 |
| Polymer D solution (prepared above) | 145.3 |
| Butylated Melamine Formaldehyde Resin solution (described above) | 62.1 |
| Mill Base (titanium dioxide pigment dispersed in a copolymer of styrene/butylacrylate/2-hydroxy ethylacrylate/acrylic acid having a pigment to binder ratio of 413/100 and a total solids content of 78.3%) | 158.7 |
|  | Total 631.4 |

The above ingredients are thoroughly blended together to form an enamel composition. This enamel is reduced to a 22 percent solids content with a solvent of methylethyl ketone/toluene in a 1/1 weight ratio. The resulting enamel is sprayed onto the following substrates:

1. Soft, self-skinned flexible urethane foam;
2. Steel coated with about 30 mils of urethane rubber.

The coating is allowed to dry for about 15 minutes and then is baked for 30 minutes at 120°C. The resulting finish is about 2 mils thick and is smooth and has a high gloss (20° gloss of about 70). The finish is tough, flexible and non-tacky at room temperature. The finish on the urethane foam does not crack at −35°C and when indented to a depth of ⅜ of an inch with a ¾ inch steel ball. The finish on the urethane rubber coated steel does not crack when subjected to 80 inch-pound bump at 25°C.

EXAMPLES 3-11

In each of the Examples, a hard copolymer and a soft copolymer are prepared using a procedure very similar to procedure as shown in Example 2, except different monomer constituents are utilized as shown in the Table. In each case, the glass transition temperature of the hard and soft copolymer are calculated. The coating composition then is prepared by blending the hard and soft copolymer in the ratio shown with a cross-linking agent. 0.2 percent by weight of para toluene sulfonic acid catalyst is added to Examples 6–8. The resulting coating composition is applied as in Example 2 to a polyurethane foam and baked as shown in the Table. A clear film is formed from each of the coating compositions, then the properties of the films are measured and recorded in the attached Table.

EXAMPLE 12

A coating composition is prepared as follows:

|  | Parts By Weight |
|---|---|
| Hard acrylic polymer solution (39.3% solids in methylethyl ketone of methyl methacrylate/ethyl acrylate/hydroxy ethyl acrylate weight ratio 50/40/10) | 17.8 |
| Soft Acrylic Polymer Solution (35.3% solids in methylethyl ketone of ethyl acrylate/hydroxy ethyl acrylate weight ration 95/5) | 8.4 |
| Isocyanate solution (75% solids solution of the biuret of hexamethylene diisocyanate in a mixture of organic solvents) | 2.0 |
| Catalyst solution (0.2% by weight dibutyl tin dilaurate in a 1:1 methylethyl ketone/ethylene glycol monoethyl ether acetate solvent) | 4.6 |
| Methyl ethyl ketone/ethylene glycol monoethylether acetate (1:1 ratio) | 1.7 |
|  | Total 34.5 |

The above ingredients are thoroughly blended together to form a coating composition.

The coating composition is reduced to a spray viscosity with conventional solvents and applied to a rubber

TABLE

| Example | Hard copolymer | Glass transition temperature, °C | R.V. | Soft copolymer | Glass transition temperature, °C | R.V. | Ratio hard to soft copolymer | Cross-linking agent | Ratio acrylic resin cross-linking agent | Bake temperature, °C | Properties of finish and film |
|---|---|---|---|---|---|---|---|---|---|---|---|
| 1 | BA/MMA/HEA/AA (50/37/10/3) | −7 | 1.102 | BA/HEA/AA (87/10/3) | −49 | 1.151 | 70/30 | Butylated MF | 100/16 | 30′ X 120 | Flexible, tough and strong, 20% elongation creaseable at −35° C. |
| 2 | BA/MMA/HEA/AA (50/37/10/3) | −7 | 1.102 | BA/HEA/AA (90/7/3) | −50 | 1.135 | 70/30 | ...do... | 100/16 | 30′ X 120 | Excellent properties. |
| 3 | BA/MMA/HEA/AA (50/37/10/3) | −7 | 1.102 | 2-EHA/MMA/HEA/AA (75/12/10/3) | −65 | ...... | 70/30 | ...do... | 100/16 | 30′ X 120 | Excellent flexibility and toughness. |
| 4 | BA/MMA/HEA/AA (50/37/10/3) | −7 | 1.102 | 2-EHA/HEA/AA (87/10/3) | −78 | 1.144 | 70/30 | ...do... | 100/16 | 30′ X 120 | Excellent properties. |
| 5 | BA/MMA/HEA (55/32/10/3) | −13 | ...... | BA/HEA (95/5) | −53 | ...... | 90/10 | Hexa(methoxymethyl)melamine | 100/8 | 30′ X 120 | Very flexible and tough; creaseable. |
| 6 | BA/MMA/HEA (60/30/10) | −19 | ...... | | | | | ...do... | 85/15 | 30′ X 150 | Hard, flexible and tough. |
| 7 | MMA/EA/HEA (50/35/15) | 27 | ...... | EA/HEA (90/10) | −22 | 1.128 | 80/20 | ...do... | 90/10 | 1′ X 275 | Hard, flexible, tough, 20% elongation before break, creaseable. |
| 8 | MMA/EA/HEA (50/40/10) | 16 | 1.081 | EA/HEA (95/5) | −22 | 1.195 | 70/30 | ...do... | 100/12 | 30′ X 130 | Very flexible and tough. |
| 9 | BA/MMA/HEA/MAA (60/27/10/3) | −18 | 1.175 | BA/HEA/MMA (87/10/3) | −48 | 1.177 | 90/10 | Methylated/butylated MF | 100/16 | 30′ X 120 | Excellent physical properties. |
| 10 | BA/BMA/HEA/AA (27/60/10/3) | −8 | 1.114 | BA/HEA/AA (87/10/3) | −49 | 1.177 | 90/10 | Butylated MF | 100/16 | 30′ X 120 | Very tough, flexible, 20% elongation at break. |
| 11 | BA/S/HEA/AA (50/37/10/3) | −7 | 1.090 | BA/HEA/AA (87/10/3) | −49 | 1.177 | 80/20 | ...do... | 100/16 | 30′ X 120 | |

LEGEND.—S=Styrene, MMA=Methyl methacrylate, BMA=Butyl methacrylate, EA=Ethyl acrylate, BA=Butyl acrylate, 2-EHA=2-Ethylhexyl acrylate, HEA=2-Hydroxyethyl acrylate, AA=Acrylic acid, MAA=Methacrylic acid, MF=Melamine formaldehyde resin, R.V.=Relative viscosity.

coated bumper and to a polyurethane foam substrate and the coating is allowed to air dry for 30 minutes and then baked for 30 minutes at 125°C. The resulting finish is clear tough and flexible.

A clear film is formed from the coating composition and has the following physical properties:
30 percent elongation at break
Tukon Hardness of 2.3
Flexible and tough.

The invention claimed is:

1. A thermosetting acrylic coating composition comprising 10–50 percent by weight of film-forming constituents and a solvent for these constituents; wherein the film-forming constituents comprise:

I. 70–95 percent by weight, based on the weight of the film-forming constituents, of a polyblend of
   A. 60–95 percent by weight, based on the weight of the polyblend, of a relatively hard acrylic polymer having a glass transition temperature greater than −20°C. to 40°C. and consisting essentially of
      1. 20–60 percent by weight based on the weight of the acrylic polymer, of methyl methacrylate or styrene or a mixture thereof;
      2. 20–75 percent by weight, based on the weight of the acrylic polymer, of an alkyl acrylate having two to twelve carbon atoms in the alkyl group or a mixture thereof;
      3. 5–20 percent by weight, based on the weight of the acrylic polymer, of a hydroxy alkyl acrylate or a hydroxy alkyl methacrylate or a mixture thereof having two to four carbon atoms in the alkyl groups;
   B. 5–40 percent by weight, based on the weight of the polyblend of a soft acrylic polymer having a glass transition temperature of less than −20°C., to −80°C. and consisting essentially of
      1. 80–95 percent by weight, based on the weight of the acrylic polymer, of an alkyl acrylate having two to twelve carbon atoms in the alkyl group; and
      2. 5–20 percent by weight, based on the weight of the acrylic polymer, of a hydroxyl alkyl acrylate or a hydroxyl alkyl methacrylate or a mixture thereof having 2 to 4 carbon atoms in the alkyl groups;
   wherein the difference in glass transistion temperature between hard and soft acrylic polymer is 35° to 70°C., and the hard and soft acrylic polymers have a relative viscosity of about 1.05–1.30.

II. 5–30 percent by weight, based on the weight of the film forming constituents, of a heat reactive alkylated melamine formaldehyde having one to eight carbon atoms in the alkyl group or a polyisocyanate.

2. The coating composition of claim 1 in which the hard acrylic polymer consists essentially of
   1. 24.9–55 percent by weight of methyl methacrylate,
   2. 35–60 percent of an alkyl acrylate having two to eight carbon atoms in the alkyl group,
   3. 5–15 percent by weight of a hydroxy alkyl acrylate or a hydroxy alkyl methacrylate having two to four carbon atoms in the alkyl group,
   4. 0.1–5 percent by weight of methacrylic acid or acrylic acid;
the soft polymer consists essentially of
   1. 85–94.9 percent by weight of an alkyl arcylate having 2–8 carbon atoms in the alkyl group;
   2. 5–15 percent by weight of a hydroxy alkyl acrylate or a hydroxy alkyl methyacrylate having 2 to 4 carbon atoms in the alkyl groups, and 3. 0.1–5 percent by weight of methacrylic acid or acrylic acid.

3. The coating composition of claim 1 in which the hard polymer consists essentially of 28–50 percent by weight of methyl methacrylate, 40–46 percent by weight of butyl acrylate, 5–15 percent by weight of hydroxy ethyl acrylate and 1–5 percent by weight of acrylic acid or methacrylic acid and has a glass transition temperature of about 16°C to −19°C.; and the soft polymer consists essentially of 80–90 percent by weight of butyl acrylate, 5–15 percent by weight of hydroxy ethyl acrylate, 1–5 percent by weight of acrylic acid or methacrylic acid and has a glass transition temperature of about −44°C. to −52°C.; and the heat reactive condensate is a butylated melamine formaldehyde resin or hexa(methoxymethyl) melamine.

4. The coating composition of claim 1 in which the hard acrylic polymer consists essentially of 35–55 percent of weight of methyl methacrylate, 30–60 percent by weight of ethyl arcylate, 5–15 percent by weight of hydroxyethyl acrylate, having a glass transition temperature of about 34°C to 10°C;

the soft acrylic polymer consists essentially of 85–95 percent by weight of ethyl acrylate, 5–15 percent by weight of hydroxyethyl acrylate, that has a glass transition temperature of −22°C. to about −23°C.

5. The coating composition of claim 4 in which the heat reactive condensate consists essentially of hexa(methoxymethyl) melamine.

6. The coating composition of claim 4 in which the heat reactive condensate consists essentially of the biuret of hexamethylene diisocyanate.

7. The coating composition of claim 1 containing 0.1–20 percent by weight of pigment.

8. A substrate having a dried coalesced coating of the composition of claim 1 which is a cross-linked, two-phase structure having the soft acrylic polymer dispersed in the hard acrylic polymer and providing substantially clear film.

* * * * *